Figure 19:
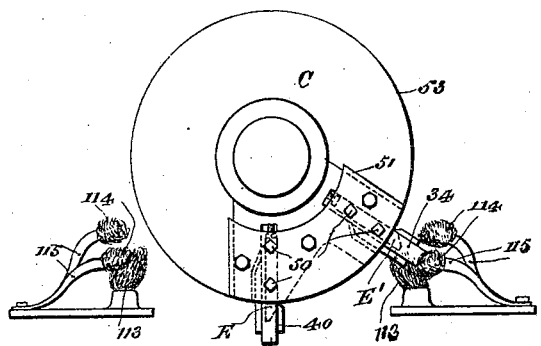

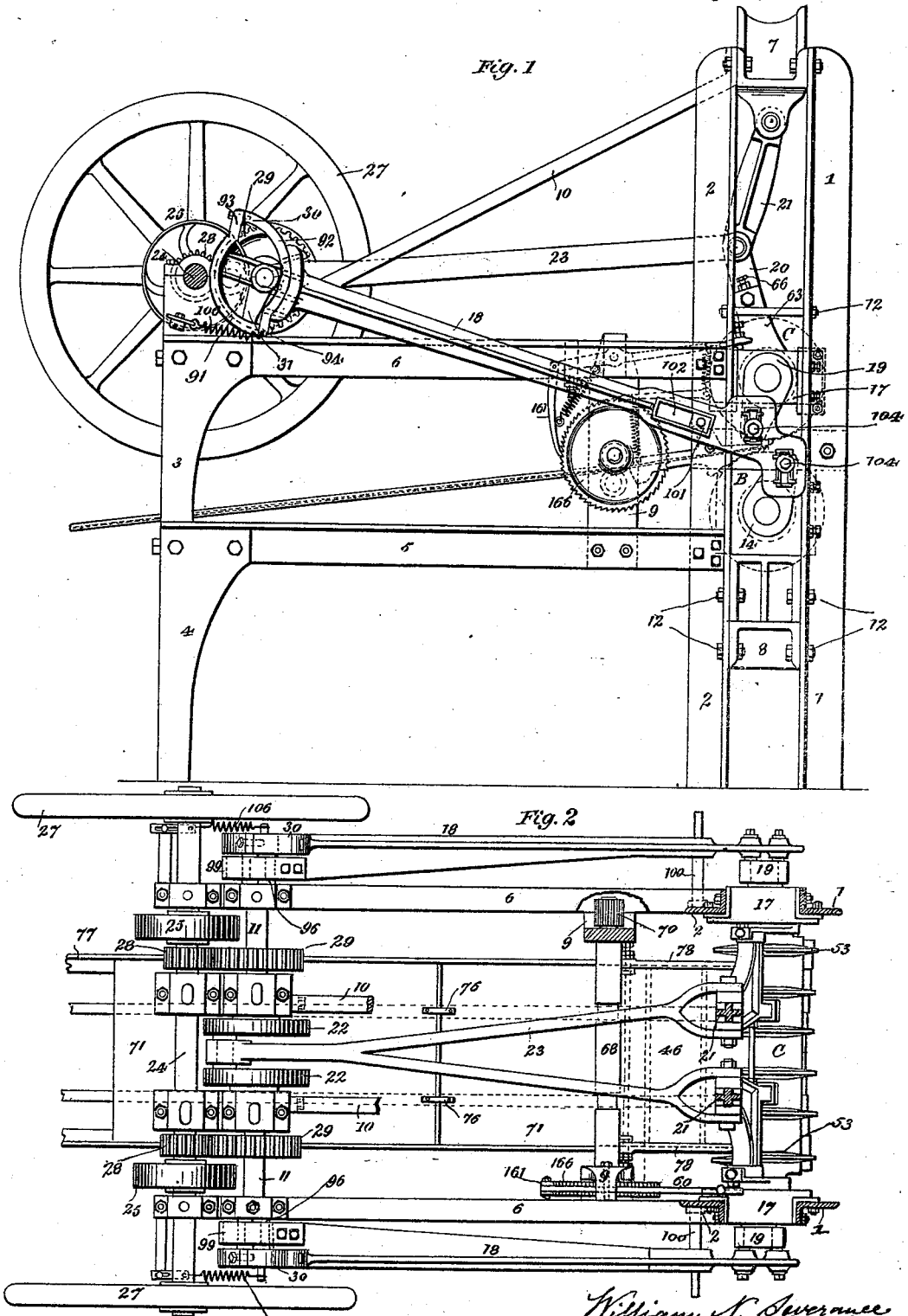

(No Model.) 6 Sheets—Sheet 2.
W. N. SEVERANCE.
MACHINE FOR CUTTING NAILS.
No. 500,958. Patented July 4, 1893.
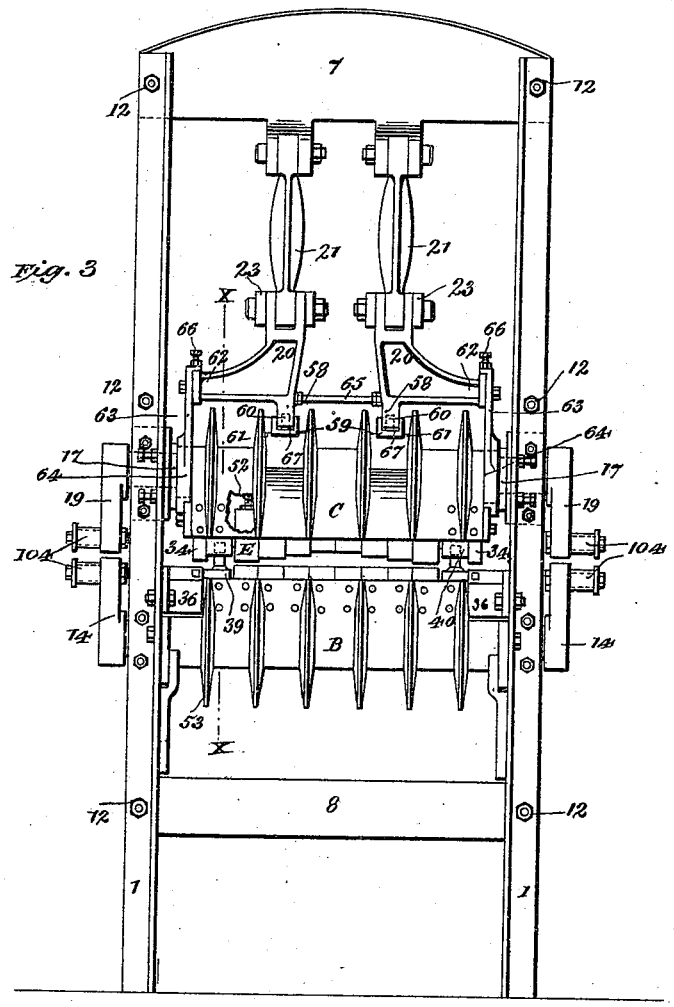
Witnesses:
Raphael Netter
Charles W. Crocker
William N. Severance
Inventor
by Kerr & Curtis
Attorneys.

(No Model.) 6 Sheets—Sheet 3.
W. N. SEVERANCE.
MACHINE FOR CUTTING NAILS.
No. 500,958. Patented July 4, 1893.
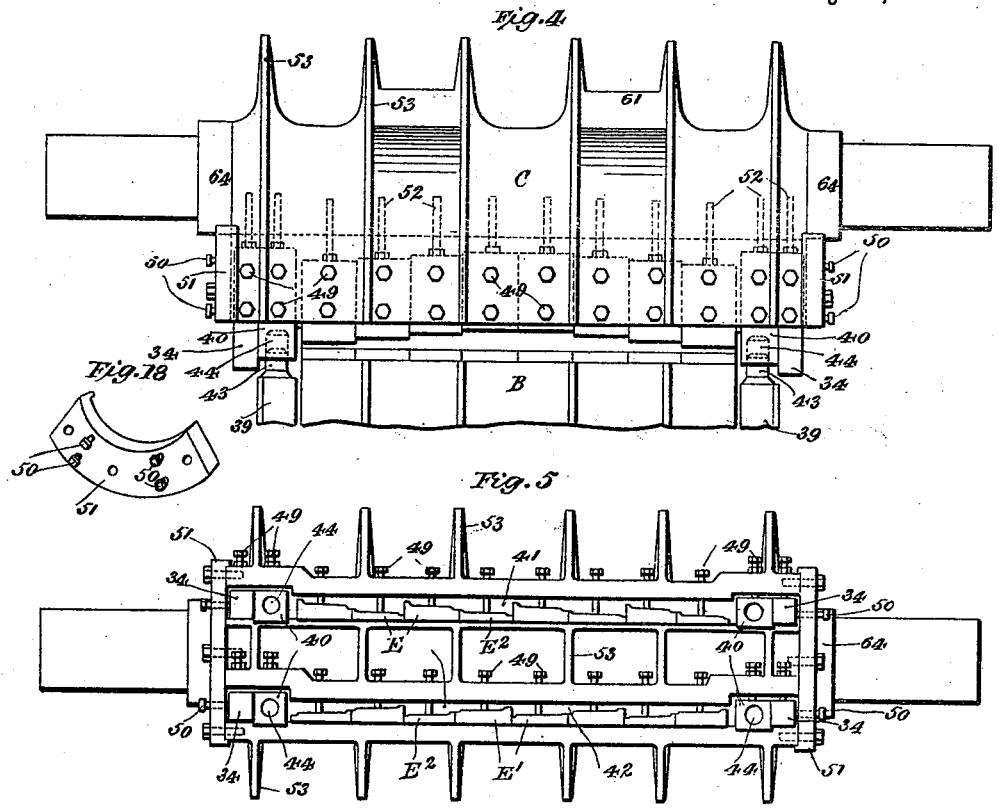
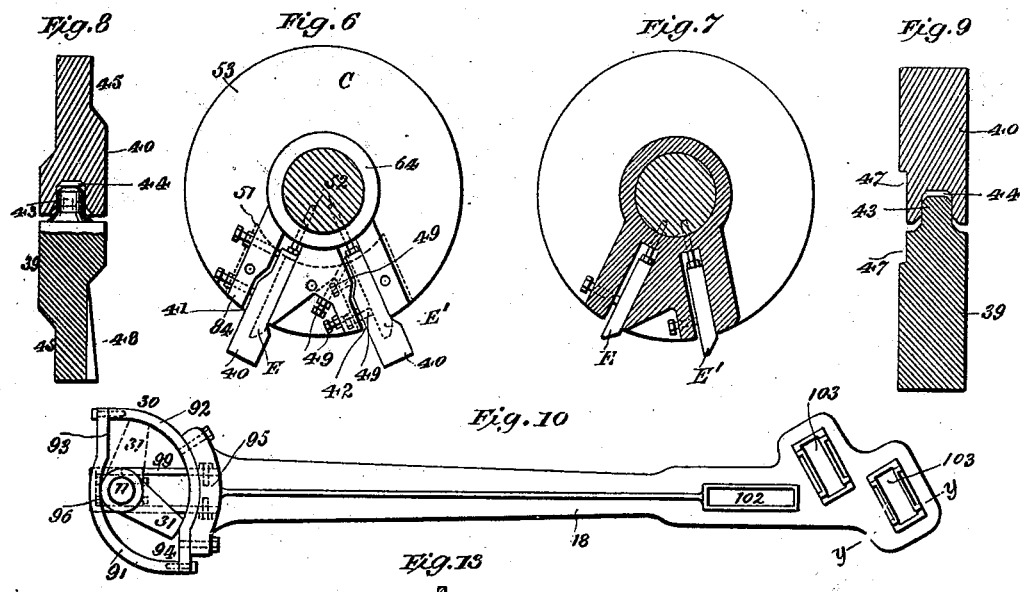
Witnesses:
Raphael Netter
Charles W. Stocker
William N. Severance
Inventor
by Kerr & Curtis
Attorneys.

(No Model.)  6 Sheets—Sheet 4.
W. N. SEVERANCE.
MACHINE FOR CUTTING NAILS.
No. 500,958. Patented July 4, 1893.
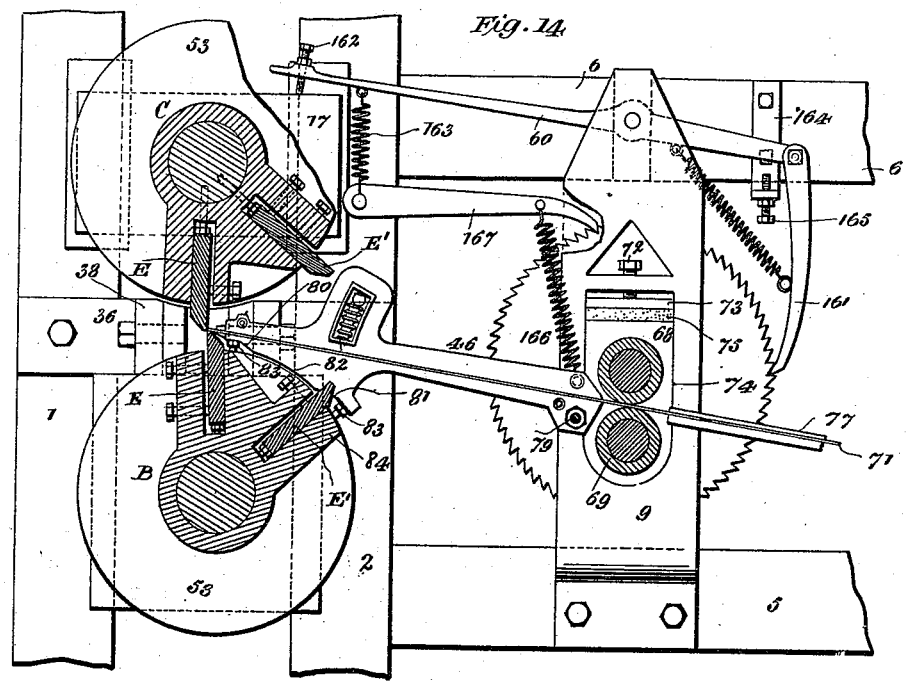
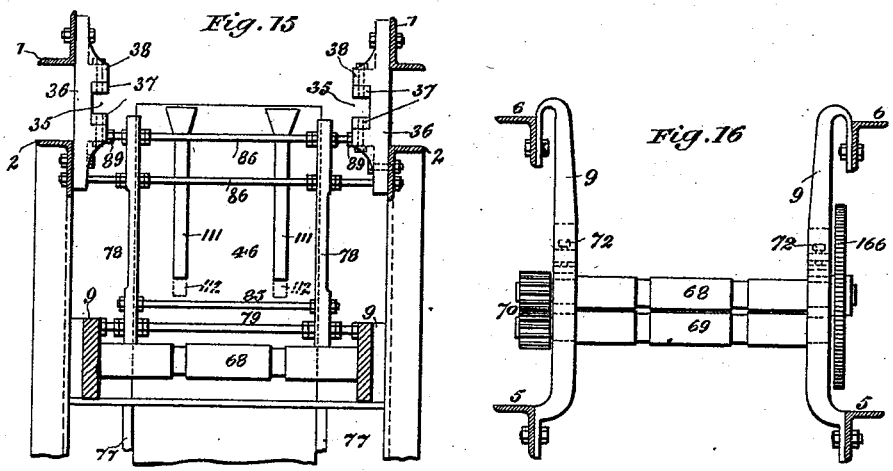
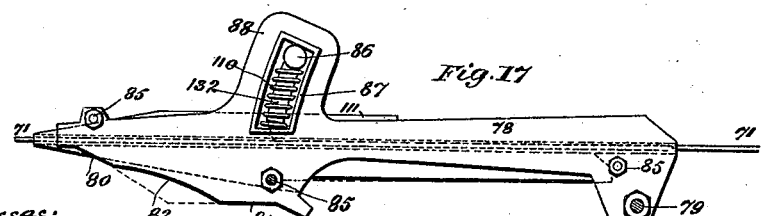
Witnesses:
William N. Severance
Inventor
by Kerr & Curtis
Attorneys (No Model.) 6 Sheets—Sheet 5.

W. N. SEVERANCE.
MACHINE FOR CUTTING NAILS.

No. 500,958. Patented July 4, 1893.

Witnesses:
Raphael Netter
Rosles W. Stocker

William N. Severance
Inventor
by Kerr & Curtis
Attorneys (No Model.) 6 Sheets—Sheet 6.

W. N. SEVERANCE.
MACHINE FOR CUTTING NAILS.

No. 500,958. Patented July 4, 1893.

Witnesses:
Raphael Netter
Charles C. Stocker

William N. Severance
Inventor
by Kerr & Curtis
Attorneys

UNITED STATES PATENT OFFICE.

WILLIAM N. SEVERANCE, OF APPLETON, ASSIGNOR TO THE SEVERANCE NAIL MACHINE COMPANY, OF ST. PAUL, MINNESOTA.

MACHINE FOR CUTTING NAILS.

SPECIFICATION forming part of Letters Patent No. 500,958, dated July 4, 1893.

Application filed November 20, 1890. Serial No. 372,037. (No model.)

*To all whom it may concern:*

Be it known that I, WILLIAM N. SEVERANCE, a citizen of the United States, residing at Appleton, in the county of Swift and State of Minnesota, have invented a new and useful Improvement in Machines for Cutting Nails, of which the following is a specification.

My present invention consists in certain improvements in the machine for cutting nails for which Letters Patent of the United States No. 191,477 were granted to me on May 29, 1877. That machine was provided with two oscillating cutter stocks, each having a vertical reciprocating motion whereby they were caused to approach each other to act upon the nail sheet or plate and to recede from each other to permit them to be oscillated and the sheet to be fed forward by suitable feeding devices to be again acted upon at their return movement. These cutter stocks were each provided with two sets or gangs of cutting knives each of which gangs acting in conjunction with a companion gang on the other stock cut several nails of the usual taper shaped body from the sheet. The cut extended transversely of the sheet. The second set or gang of knives then made a similar cut but with the taper of the nails extending in the opposite direction, so that the end of the sheet was prepared for a repetition of the first cut.

The most noticeable difference between my present machine and that described in my said patent consists in the fact that in my present machine the lower or bed-cutter stock is mounted in stationary bearings, so that it has no reciprocating motion as in the former case, the reciprocating motion necessary in effecting the cut being confined to the other cutter stock. With this exception the general description just given will apply equally well to my present machine.

To enable others skilled in the art to make and use my invention I will now describe it by reference to the accompanying six pages of drawings, in which—

Figure 20:
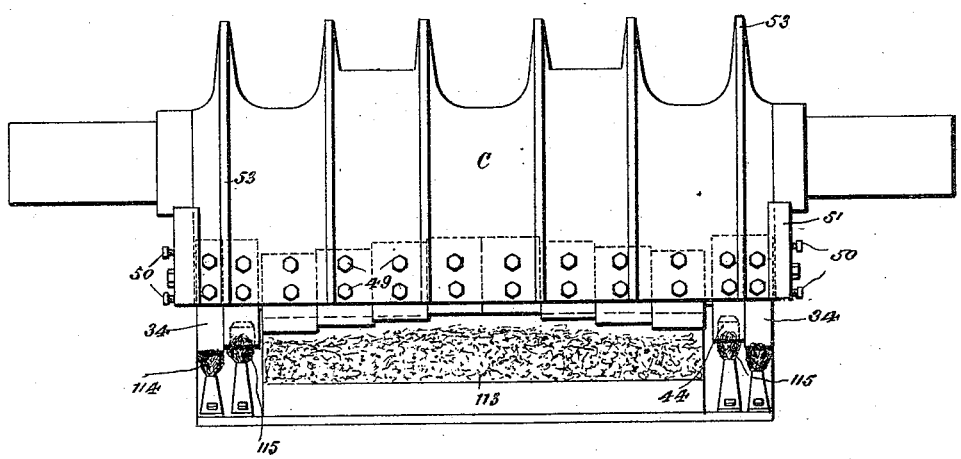
Figure 21:
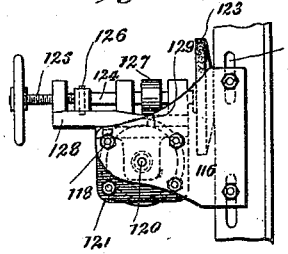
Figure 22:
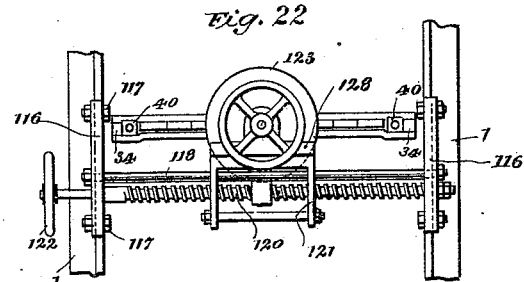
Figure 23:
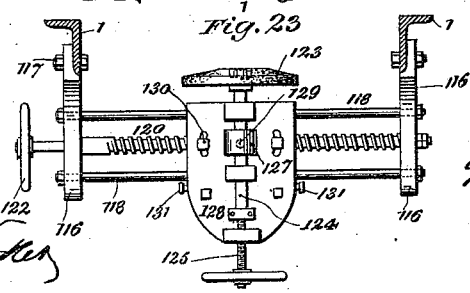
Figure 25:
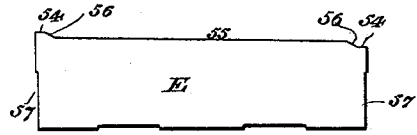
Figure 26:
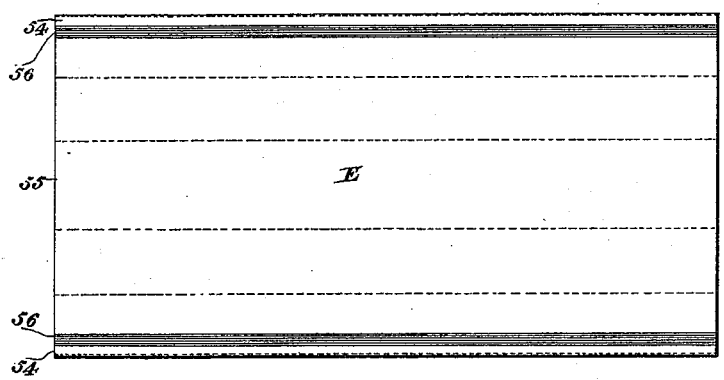
Figure 27:
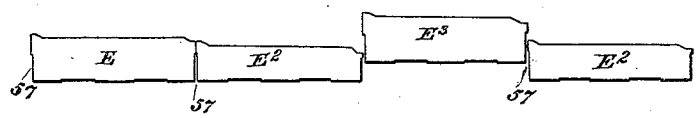
Figure 28:
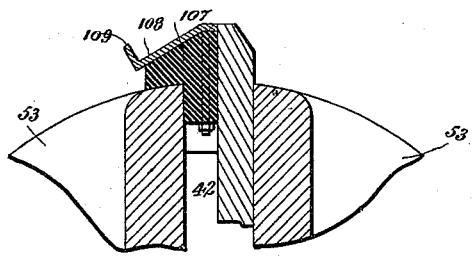
Figure 29:
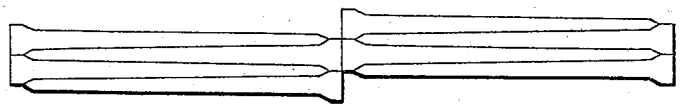

Figure 1 is a side elevation of the machine. Fig. 2 is a plan view partly in section. Fig. 3 is a front elevation. Fig. 4 is a front elevation of the reciprocating cutter stock showing the position of the guides and cutters and the form of the strengthening flanges. Fig. 5 is a bottom plan view of the reciprocating cutter stock. Fig. 6 is an end elevation of the cutter stock showing the manner of securing the cutters and guides thereon. Fig. 7 is a similar view of the former construction. Fig. 8 is an enlarged side elevation of the pin and socket guides in section. Fig. 9 is an enlarged front elevation of the pin and socket guides in section. Fig. 10 is a side elevation of the shift head and bar. Fig. 11 is a perspective view and Fig. 12 is a side elevation of the supporting and guiding box. Fig. 13 is a cross-section of the shift bar on line $y$—$y$, Fig. 10. Fig. 14 is a vertical section of the cutter stocks and feed rolls. Fig. 15 is a plan view of the sheet rack, sheet clamps and bridges. Fig. 16 is a rear elevation of the feed rolls and standards. Fig. 17 is a side elevation of the sheet guide and clamps. Fig. 18 is a perspective view of the channel cap. Fig. 19 is an end elevation, and Fig. 20 is a side view of the oiling devices, shown in Fig. 19. Fig. 21 is a side elevation, Fig. 22 a front elevation and Fig. 23 a plan of the grinding device. Fig. 24 is a front elevation of the shift crank 14 of the bed cutter stock B. Fig. 25 is an end view and Fig. 26 is a plan view of a cutting knife. Fig. 27 is an end view of a gang of knives. Fig. 28 is a cross-section of a bed knife and its yielding nail retainer and apron. Fig. 29 is a plan view illustrating the formation of nails from the sheet.

Like characters of reference indicate like parts in the various figures.

The objects of my present improvements are to produce a frame which will be sufficiently rigid to resist without vibration the oscillation of the cutter stocks and the impact of the cutters and so constructed and arranged as to facilitate the assembling and adjusting of the guides and cutters and other parts, the removal and replacing of the cutter stocks, the grinding of the cutters while in position, and the observing of the operations of the various parts of the machine; to avoid unnecessary expense in construction and operation resulting from reciprocating the lower or bed cutter stock; to secure great rigidity and strength in the lips of the cutter channels, accuracy in locating the cutters in their relation to each other and to the nail sheet, clearance between the bed cutters and the sheet as the bed cutters are oscillated, and improved cushioning devices to protect the machine from the heavy impact of the cutter stocks; and to provide for the grinding of the knives in place and the automatic oiling of the knives and guides.

The frame of my improved machine is composed (see Fig. 1) of uprights 1, 2, 3, 4, horizontal bars 5, 6, lintel 7 and sill 8. The cutter stocks are supported in uprights or housings 1, 2, and the driving mechanism is supported on the horizontal bars 6 and the feeding mechanism upon uprights 9, extending between the upper and lower side bars 6, 5. The various parts of this frame are preferably constructed of flanged iron or steel. The braces 10 (Fig. 1) extend from the boxes of the main shaft 11 of the machine to the lintel 7 and are rigidly bolted in place. This construction forms a truss like frame which is very strong and unyielding under the oscillation of the cutting stock and the impact of the cutters, and sustains the operative parts of the machine in an accessible and convenient manner, affording great facility for inspection and repairs.

The housings or uprights 1 are bolted to the lintel and sill and can be readily removed by loosening the nuts 12, for the purpose of removing one or both of the cutter stocks without disturbing the other parts of the machine, either for repairs or to substitute therefor other cutter stocks having different sized cutters. In this way one machine can be readily adapted to cutting several different sizes of nails. This interchangeability of the cutter stocks enables an enormous saving of capital to be effected, because with five of my machines all the thirty-five sizes of nails now used in the market can be made, instead of requiring a separate machine for each two or three sizes. The feed has to be changed with each change of the machine to cut different sizes of nails but this is easily effected by changing the feed ratchet wheel or by adjusting the stroke of its driving pawl as will be readily understood.

The lower, or bed knives, are mounted in an oscillating bed cutter stock B, which is journaled in stationary boxes or bearings between the uprights 1 2, and is operated from the main shaft 11 by the shift bars 18 and cranks 14. It has two sets or gangs of knives E E′ (Fig. 14), which are brought alternately into a cutting position by its oscillating movement to operate with similar sets or gangs of knives on the upper or reciprocating cutter stock in acting on the nail plate.

The reciprocating and oscillating or cutting knives, are mounted in an oscillating and reciprocating cutter stock C, which is journaled in sliding boxes 17 between the uprights 1, 2, and is oscillated by means of the shift bars 18 and cranks 19, and reciprocated by the toggle levers 20 21, which in turn are operated from the main shaft 11 by the crank 22 (Fig. 3) and connecting rod 23. The cutter stock C is provided with two sets of guides which will hereinafter be particularly described, whereby it is guided in its reciprocating movement with extreme accuracy so that safety to the knives and the production of perfect nails are insured.

The operating mechanism is mounted on the rear end of the horizontal bars 6. It consists of a power shaft 24, which is driven from a prime motor by pulleys 25, and is regulated by the fly wheels 27. It is provided with pinions 28, which drive the main shaft 11 by means of spur wheels 29 mounted thereon. The shaft 11 operates the toggle 20 21 by means of the crank 22 and connecting rod 23, and oscillates the stocks B and C by means of the cam yokes 30, cams 31, and shift bars 18. The rolls 68, 69, (Figs. 14 and 16) for feeding the sheet are journaled in the vertical side pieces 9, and are operated by a lever and pawls which will be fully described, to give an intermittent feed of the sheet during the retraction of the cutting stock C, such movement being produced by the rising journal box 17 of the stock C acting on the lever.

I will now describe the two sets of guides before referred to. Referring to Fig. 5 it will be noticed that in the four corners of the figure are rectangular parts marked 34. Fig. 5 is a bottom plan view of the cutting stock. These four pieces 34 I call position guides and a side view of two of them will be seen in Fig. 4. When the cutting stock C has completed its oscillation and brought one gang of knives in position to make a cut it is caused to descend by the operation of the toggle 20 21, and as it does so the guides 34, which project from the lower face of the stock at the ends of the channel in which the gang of knives is secured enter guide-ways or recesses 35 (Fig. 15) formed in the inner edges of side bars or bridges 36, which extend one on each side between the uprights 1 2. One of these bridges is shown in elevation in Fig. 14 and both of them in plan in Fig. 15. The guide-ways or recesses 35, are provided with adjustable gibs 37, which are held in position by cap bolts and are adjustable by means of metallic liners placed between the jaws 38, and the gibs 37. The position guides 34, and the guiding recesses 35, can be adjusted with absolute precision so as to insure the knives making a perfect cut. It will be understood that there are two of the guides 34, for each gang of cutting knives and that they are alternately brought in position over the guide-ways or recesses 35.

The second set of guides is illustrated in Figs. 4, 5, 8 and 9, and consists of pin guides 39 on the bed stock B and corresponding socket guides 40 on the cutting stock C. There are four socket guides 40 on the cutting stock C, each one arranged in the end of a knife channel 41 or 42 just inside of the position guide 34, as clearly illustrated in Fig. 5. The corresponding four pin guides 39, are placed in the ends of the knife channels of the bed stock B in a position corresponding to that of the socket guides 40 in the cutting stock C, so that when the latter descends in making a cut the pins 43 on the guides 39 will enter the recesses 44 in the guides 40, as clearly illustrated in Figs. 4, 8 and 9.

Heretofore I have found great trouble in guiding the cutters so as to avoid their contact with each other and yet to pass close enough to make a suitable cut and to preserve their relations to each other unchanged in the practical operation of the machine as the jar and vibration caused by the oscillation of the heavy stocks and their impact tend to produce slack, which necessitates the provision of some practical and reliable centering device. I secure such a device in my pin and socket guides 39, 40. As these parts are exposed to heavy usage it is desirable to make them as large and strong as is consistent with the small spaces available for their location at the ends of the knife channels. These remarks apply also to the position guides 34, on the cutting stock C. I obtain the requisite amount of room for their proper size and location by enlarging the ends of the knife channels, as shown in Fig. 5. The shanks of the guides 39, 40, are cut away as at 45 to save space and dispense with unnecessary weight, and in order to provide room for the ends of the sheet rack 46, (Figs. 14 and 15) and to give clearance for the grinding disk which is used for grinding the knives when in position, as hereinafter described, I cut away the inner sides as at 47 (Fig. 9). The guides are located with their axial centers slightly in advance of the cutting line of the knives so that the latter will clear when the machine is first brought together.

In order to provide clearance for the cutters immediately after the cut is made I locate the bed stock about half an inch inside of the vertical line of the cutter stock, as shown in Fig. 14, and then, in order to bring the pin guides 39 to a vertical position so as to enter the socket guides 40 on a common axial line, I form their rear sides with an incline, as shown at 48, Fig. 8, such incline being equal to the divergence from a vertical line of the working face of the channel of the bed cutter stock which is in cutting position.

The knives E, E', are flat rectangular pieces of steel with beveled cutting edges and have an end cutting outline conforming to the shape of the nail to be cut. They are secured to the stocks in the manner shown in Fig. 6, the old construction being shown in Fig. 7. Each stock is provided with two channels 41, 42, in which the knives are secured. In the old form shown in Fig. 7 these channels diverge from each other by a comparatively acute angle and the intervening web of metal was so small that it afforded room for but one binding set screw to secure the knife to the stock. In my improved form shown in Fig. 6 the angle is more divergent and the web between the two channels is consequently thicker, so that it can be cut away more deeply and thereby allow of the use of two lines of set screws 49, for holding the knives and guides in place. The knives and guides of each gang are placed side by side in its channel against the straight side of the same and secured firmly in position by the set screws 49, shown clearly in Fig. 4, and they are located in longitudinal position by the set screws 50, working through the channel caps 51, (Figs. 4 and 5,) the caps being secured in position by cap bolts as shown. The guides 34, 39, 40 and the knives are all held in their projected positions by set screws 52. In case of inequality in the thickness of the knives they are brought into correct cutting position and alignment by means of thin metallic strips or liners placed behind them in their channels, as will be readily understood. The knife stocks B and C are constructed with annular strengthening flanges 53, (Figs. 4, 5 and 14) which impart rigidity to the sides of the channels thereby avoiding all springing of the same and the consequent displacement of the cutters and the production of imperfect nails. This is a matter of great importance because owing to the necessary weight and the rapid motions of the knife stocks involving the quick starting and stopping of the same it is very desirable to secure the minimum weight combined with the necessary strength, as thereby the durability of the machine is greatly increased.

The bridges 36, (see Figs. 14 and 15) are rigidly bolted to the side of the uprights 1, 2, and the lower surfaces of the jaws 38, and their gibs 37, are dressed on a circle and so arranged as to rest with a working fit upon the bed stock B. The object of this is that in case by any accident the cutting stock C should descend upon and strike the bridges they would be supported by the bed stock B and not broken or displaced by the weight thus accidentally brought upon them, and in addition to this this construction produces a more compact, closely working and better machine.

The cutters E, E' (Figs. 5 and 27) are formed exactly alike except that the alternate ones shown at E² (Fig. 27) are thinner than the others by a distance equal to one-half the width of the head of the nail, the object being to provide for cutting the head of the nail by one stroke of the machine, since if the knives were of uniform thickness the head would be formed by two strokes of the machine causing imperfect heads. The form of the knife is shown by Fig. 28. It is provided with surfaces, 54, parallel to the transverse axis in order to give strength to these parts of the same and consequent durability to the knife. This form of knife produces a nail head with parallel sides instead of the V shaped head, and the reason I have devised this shape is that a knife so made is more durable than one with a sharp corner because the latter was liable to become broken or worn and to cut imperfect nails. The incline of the cutting edge 55, determines the taper of the nail and the inclined edges 56, form bevels on the head and point of the nail. To facilitate removal and replacement the knives are formed with cutaways 57, at their impinging edges so that a knife can be released from its position as shown at $E^3$ in Fig. 27, after its set screws 49 are slackened by a light blow on the under side, thereby obviating the necessity of loosening the set screws 50, and taking out the other knives, which would result in losing the adjustment of the whole gang. This form of knife can be readily and accurately manufactured and being void of all holes or slots is especially free from danger of fracture in tempering and is capable of being used at both ends and ground until but a small portion of it remains. The knives are arranged relatively to each other as shown in Fig. 20, in which the end knives have the greatest projection from the stocks and the central knives the least, the intermediate ones receding gradually. The object of this arrangement is to cause the sheet to be first engaged at the edges by the cutters so as to hold it straight and prevent it from buckling as the cut proceeds.

The toggle levers 20, 21, (Fig. 3) are provided with working arms 58, having shoes 59, which are held in position by the pins 60. The shoes bear on the shoulders 61, of the cutting stock C and the impinging faces of the shoes 59, and shoulders 61, are concentric. These are the devices by which the toggle 20, 21, forces the cutter stock to descend in making a cut. The toggle lever is also provided with lifting arms 62, having stirrups 63, which embrace the trunnions 64, of the cutting stock C and thereby raise it. An adjustable spreader 65 is placed between the working arms of the toggle to avoid the strain in lifting the cutting stock, and the stock may be adjusted as to height by means of the adjusting nuts 66, such adjustment being compensated for by plates 67 inserted between the shoes 59 and the working arms 58.

I utilize the upward movement of the cutting stock preceding each cutting stroke of the machine for the purpose of feeding the nail sheet to the cutters by the following devices which in practice I find afford a reliable feed motion.

Referring now to Fig. 14, the feed lever 60 is sufficiently rigid to accomplish its work without yielding and yet elastic enough to yield under abnormal strains so as to avoid fracture, as in case a nail or a detached portion of the machine or some implement should accidentally fall on the sheet and pass through the feed rolls. This lever is pivoted to the standard 9 and is provided with the driving pawl 161, a tension adjusting screw 162 and a returning spring 163. The adjusting screw 162 rests upon the top of the sliding journal box 17 of the cutting stock C so that the upward movement of the box 17 shall operate the lever 60, and thereby the feeding devices. The lever 60 is also provided with a feed stop 164 which is rigidly attached to the frame 6 and has an adjusting bolt 165 whereby the movements of the lever in the feed direction can be regulated. The pawl 161 operates in conjunction with a ratchet wheel 166 and the lever 60, and is so adjusted by means of the adjusting screw 162 as to cause the ratchet wheel 166 to turn the distance of one tooth with each upward movement of the sliding box 17, and the stop pawl 167 is pivoted to the standard 2 and held in engagement with the ratchet wheel 166 by means of a spring secured to the sheet rack 46 so as to hold the ratchet wheel 166 steady after each movement thereof. The movement given to the ratchet wheel 166 is sufficient to feed the nail sheet a distance equal to the mean width of the nail. By a suitable adjustment of the stop bolt 165 any further upward movement of the sliding box 17 will not be communicated to the ratchet wheel 166 but will be taken up by the yielding of the feed lever 60. By these devices I secure a positive and uniform motion of the ratchet wheel 166 which is rigidly attached to the journal of the feed roll 68 and the latter is connected with its companion feed roll 69 by means of a compound gear 70, the latter being adjusted in such a manner as to avoid the back lash of the roller 69. The required pressure is brought upon the nail sheet 71 by means of the set screw 72 bearing upon the plate 73 and the sliding box 74 between which is interposed a plate of rubber or other yielding substance 75 which will allow the feed rollers to adjust themselves to inequalities in the thickness of the nail sheet without danger of fracture.

The nail sheet 71 is as wide as the gangs of cutters E, E' and of any desired length. It may be made up of a number of pieces or sheets fastened to each other by means of cleats and rivets, as shown at 76 (Fig. 2), which can be riveted together upon the feed rack as the machine is running. The annular grooves in the feed rolls (Fig. 16) permit the passage of these cleats and rivets between them without obstruction. On its way to the feed rolls the sheet is guided by the projecting flanges 77 (Fig. 14) of the sheet rack, and on passing the rolls it is received in the grooves of the sheet guides 78 (Figs. 14 and 17) which form the principal part of my improved sheet rack 46. These guides 78 are hung or pinioned upon the trunnion rod 79 attached to the standards 9, and are constructed with eccentric surfaces 80, 81, and an intermediate concentric surface 82, which surfaces are designed to engage with set screws or projections 83 extending up from the lips 84 of the bed stock B (Fig. 14). The sheet guides 78 are rigidly connected together by means of the screw threaded rods 85 secured by suitable nuts, and are held in position by the suspension rod 86 which passes through the concentric slot 87 in the lug 88 and upright 2. Adjusting nuts 89 are placed upon the projecting ends of the front frame rod 85 (Fig. 15), and are so adjusted as to bear upon the inner vertical surfaces of the jaws 38 of the bridge 36 and thereby guide the feed rack 46 in its vertical movement, and the sheet guides 78 are adjusted to position so as to guide the sheet properly over the cutters and all parts of the rack are rigidly held in relative position by check nuts, as shown.

The cam yoke or shift head 30 (Figs. 1 and 10) consists of the concentrics 91, 92, and the shoulders or straight surfaces 93, 94, which extend at right angles to the axial line of the shift bar. This yoke is preferably formed of heavy bar steel or wrought iron with steel working faces and is attached to the shift bar. It is provided (Figs. 2 and 10) with a suspension stirrup 99 which is centrally located in it and attached to the shift bar 18 by means of suitable bolts extending through the shoulder 95.

The supporting and guiding box 96 (Figs. 10, 11 and 12) is located upon the main shaft 11 and is provided with half flanges 97 and elastic buffers or cushions 98 which are attached thereto, preferably by means of their stems entering threaded holes in the sides of the same. The cam or shift arm 31 is rigidly attached to the end of the main shaft 11 and operates inside of the yoke 30 to give the necessary intermittent reciprocating motion to the shift bar 18, for which purpose it travels upon the concentric surfaces 91 92 and engages the surfaces of the shoulders 93 94. Its operation is illustrated by the full and dotted lines in Fig. 10. Take, for instance, the position indicated by the dotted form; this location of the cam 31 is so timed on the shaft 11 in relation to the operation of the machine that the cam will engage the shoulder 93 immediately after the guides of the cutters E' have been released from their engagement by the upward motion of the cutting stock C; the cam then bearing against the shoulder 93 causes the shift bar to oscillate the cutter stocks B and C and then travels around on the concentric surface 91 while the cutter stock C is descending and making a cut with the knives E and retracting when it engages the shoulder 94, as shown in the full lines, thereby moving the shift bar 18 and again oscillating the rolls. Its position at the completion of this operation is shown by the full lines in Fig. 10. A great practical advantage of this construction in a heavy and fast running machine is that the oscillatory motion of the cutting stocks is comparatively slow at first owing to the engagement of the cam with the shoulder of the cam yoke at a point near its center of motion as shown by the position of the upper dotted form in Fig. 10, which motion is rapidly increased as the full length of the cam engages the shoulder and is retarded or slowed down as the point of the cam reaches the end of the shoulder. This greatly facilitates the practical operation of the machine by affording a comparatively slow motion in starting and stopping the oscillation of the heavy cutter stocks and their connections. The cams or shift arms 31 while traveling on the concentric surfaces 91, 92 hold the shift bars against the cushions 98 and prevent the rebound which would interfere with the operation of the position guides 34. The stirrup 99 affords in connection with the box 96 and the shaft 11 a durable and practical support for the end of the shift bar, and also a suitable location for the elastic cushions 98 to receive the heavy concussions and arrest the oscillatory movement of the cutter stocks and shift bars. The other ends of the shift bars are supported by the studs 100 (Figs. 1 and 2) resting thereon by means of the boxes 101 which travel in the slots 102. The shift bars 18 are also provided with slots 103 extending at an angle to the axes of the bars so that when the bars are in their inclined position in the machine the slots shall stand vertically to receive the studs or wrist pins 104 of the cranks 14 and 19 on the ends of the cutter stocks B, C. The cranks 14 and 19 are constructed with an elongated wrist pin hole 105 as shown in Fig. 24, the purpose of which is to secure economy of construction and repair and nice adjustment or location of the studs or wrist pins 104 and to time the oscillatory motion of the cutter stocks so as to prevent the position guides 34 striking the bridge gibs 37 and the pins 43 striking the edges of the socket guides 40. After the studs or wrist pins 104 are correctly located in the wrist holes 105, the remaining space about them is filled with suitable Babbitt metal. The shift bars being inclined their forward motion is accelerated and their backward motion retarded by gravity and to overcome the irregular motion and concussion caused by this position I attach the retrieving springs 106 (Figs. 1 and 2) to the cam yoke 30 and to an arm extending from the frame of the machine in the rear of the shaft 24.

In order to discharge the nails which are cut by the knives E out of the machine as they are cut and to avoid cutting or crippling them I place a block of rubber or other yielding substance 107 with its shank extending into the channel 42 in front of each knife and protect it by a plate or apron 108 having a flange 109 extending along its edge; the descent of the knives after having completed the cut is provided for in the yielding of these elastic aprons and as the knives recede the aprons return to a position nearly level with the bed knives so as to present no obstacle to the casting off of the nails rearward.

The position of the machine being that shown in Fig. 14 where the downward motion has been completed and a series of nails cut from the sheet, its operation is as follows: The upward reciprocating motion of the cutting stock C disengages the pin and socket guides 39, 40 and releases the position guides 34 from the bridges 36 and raises the sliding box 17 which engaging the feed lever 60 causes the sheet to be fed into the machine the proper distance by means of the ratchet wheel and feed rolls. As the cutter stock B is oscillated into position for the succeeding cut the projections or set screws 83 engage the eccentric surfaces 80 and lift the forward end of the sheet rack to permit the knives E' to swing under the sheet and then travel upon the concentric surface 82 during which motion the sheet is retained in position, the nuts on the suspension rod allowing the free upward and downward motion of the sheet rack. The eccentric surface 81 permits the sheet rack to descend by gravity and by the operation of the spring 110 to its original position as the knives E' reach their cutting position placing the projected end of the sheet upon the bed knives ready for the action of the cutting knives. The stop bolts 132 prevent an excessive upward motion of the sheet rack in the rapid operation of the machine while the adjustable nut guides 89 playing vertically upon the smooth inner surfaces of the jaws 38 prevent any lateral deviation of the sheet from its correct position during the operation. The knives E, E' in both stocks which occupy positions in the same vertical planes are exactly opposite to each other, so that they will register precisely in the cutting operation. If they did not do so or if any lateral displacement of the sheet should occur between any of the succeeding cuts of the machine it would produce imperfect nails as it would displace the central position of the point and render the heads unequal. It is consequently of the greatest importance to preserve the sheet from lateral displacement and the knives in proper registration as just described. When the toggle 20, 21 begins to straighten by the action of the crank 22 and connecting rod 23, the shift or oscillation has been completed and the position guides 34 of the knives E' are now vertically over the guide ways or recesses 35 in the bridges 36 and guided by the pins 104 in the upper slots 103 of the shift bars 18 they enter the recesses 35 and the cutting stock is then brought to an exact position for making a cut with the knives E'; the bed stock B is also shifted at the same time and held in position by its pins 104 in the lower slots 103 so that on the further descent of the cutting stock the pin and socket guides 39 40 shall engage each other and bring the bed stock into exact and unyielding position for the cut. At this instant the cutting knives engage the projected sheet and a series of nails are cut and fall on the receiving apron 107 and at the backward or next movement of the stock are cast off as before described. The next oscillation of the machine returns the parts to the position shown in Fig. 14 ready to make a cut with the knives E. The portions of the sheet guides 78 which form the eccentric surfaces 80 81 and the concentric surfaces 82 are sufficiently reduced to pass freely in the space between the knives and the pin socket guides formed by the cutaways 47 on the sides of the guides 39 40. The sheet clamps 111 (Figs. 15 and 17) are flattened and broadened at the outer ends to pass under the upper rod 85 and their rear ends are slightly curved downward to carry the front edge of the sheet 71 down in a line with the sheet grooves and the lower clamps 112 similarly constructed and located on the under side of the sheet and held in position by the lower rods 85 clamp the sheet firmly and hold it flat and in its proper position and prevent it being lifted by the retraction of the upper knives.

It is of the utmost importance to keep a machine of this character suitably oiled, especially the guides 34, 39, and 40 which are of tempered steel and work very closely together; and I have learned by practical experience with these machines that the knives will run much longer and be less liable to fracture if properly oiled. To accomplish this I have devised the automatic oiling appliances consisting of the line of sponges or other oiling substances 113 and 114 shown in Figs. 19 and 20, and so mounted them that they engage the cutting edges of each gang of knives and the ends of the guides in their descent as the other gang of knives is making a cut. The sponges 114 are maintained in position by springs 115 or other suitable supports. The sponges 113 oil the knives and the sponges 114 the guides.

The accurate grinding of the knives is one of the most difficult and expensive items in the operation and maintenance of machines for cutting nails. The removal of the knives for grinding from any nail machine and particularly from series cutting machines involves skill and loss of time in replacing and readjusting the same. To avoid this and to reduce the cost of the operation of grinding the cutters of my machine I make use of the apparatus shown in Figs. 21, 22 and 23, which I have thus shown to illustrate the capacity of my improved machine to have the knives accurately and quickly ground without removal from the cutter stocks, whereby such removal and the difficult and tedious work of replacing and readjusting them are obviated. It has two brackets 116 capable of being removably and adjustably attached to the uprights 1 by means of bolts and slots 117. These brackets support the ways 118 and the feed screw 120; the sash 121 is fitted to the ways 118 and its central flange is suitably threaded to engage the feed screw 120, which is operated by the hand wheel 122; the grinding disk 123 is attached to the traveling mandrel 124 and is coupled to the adjusting screw 125 by means of the coupler 126; the driving pulley 127 is attached to the mandrel by means of a freely acting feather key and works between the boxes of the mandrel; the mandrel plate 128 is attached to the sash 121 by a pivot 129 and cap bolts 130 and is provided with slots for the cap bolts, as indicated in the drawings, with a stop lug 131. The general plan of my nail machine, including the frame is constructed, among other things, with a view to the advantages to be derived from its automatic grinding devices. The cutter stocks are so constructed and arranged that by simply disconnecting the shift bars 18 from the cranks 14 and 19 and swinging the feed ends of the shift bars horizontally off from the crank pins, (which motion is provided for by the construction and location of the half flanges 97 shown in Fig. 11) and leaving them resting upon the extended studs 100, they may be oscillated or swung on their journals so that the cutting edges of the gangs of knives in their channels can be successively presented in a line about horizontal with their journals, so that any proper bevel or incline may be ground upon the knives. The grinding disk 123 is constructed to grind with its inclined face and the mandrel plate 128 is swung to the right or left as the case may be to bring the grinding surface of the disk into proper contact with the knives to be ground and is fastened in that position by the cap bolts. The disk is then fed against the cutters by means of the hand wheel and feed screw 125 and the traveling sash moved back and forth along that end of the gang of knives by means of the feed screw 120 until the same are suitably ground. Then the mandrel plate is shifted against the opposite stop lug 131 and the other end of the gang of knives ground in like manner. Before grinding the cutters they should be projected to a line so as to grind uniformly. The mandrel plate 128 may be located horizontally as shown, or at any desired angle. The projections of the cutters so that but two of them are in contact with the nail sheet at the same time greatly reduces the strain upon the machine because it is then cutting not more than two nails at a time. A cupped emery wheel may be used instead of the beveled grinding disk 123.

It is obvious that the skilled mechanic can vary the construction of many of the devices and parts of the hereinbefore described machine by substituting therefor equivalent devices without departing from the spirit of my invention, or without changing the principles which govern its operation; and, therefore, I do not, in the claims appended to this specification, limit myself to the precise construction and arrangement of the parts, except when such limitation is particularly pointed out in the claims.

What I claim as my invention, and desire to secure by Letters Patent, is—

1. In a machine for cutting nails, the frame consisting of the detachable uprights 1, the uprights 2, the horizontal frames 5, 6, braces 10, and the feed roll standards 9; substantially as and for the purposes set forth.

2. In a machine for cutting nails, having oscillating cutter stocks, the combination of a frame for supporting the operative parts, with detachable uprights or housings for retaining the boxes of the cutter stocks in position, whereby the cutter stocks can be removed or interchanged with facility and without disturbing the other parts; substantially as described.

3. A machine for cutting nails, having an oscillating bed stock mounted in stationary bearings and provided with two or more cutting knives and an oscillating cutter stock, mounted in reciprocating bearings and provided with two or more cutting knives; substantially as and for the purposes set forth.

4. In a machine for cutting nails, the oscillating bed-stock B mounted in stationary bearings and provided with two channels for cutting knives; in combination with the oscillating and reciprocating cutter stock C, mounted in reciprocating bearings and also provided with two channels for cutting knives companions to those in the bed stock B; substantially as and for the purposes set forth.

5. In a machine for cutting nails having an oscillating bed stock and an oscillating and reciprocating cutting stock for carrying the cutting knives, the combination of socket guides arranged in the line of the cutters on one stock, with engaging pin guides arranged in the line of the cutters on the other stock, for the purpose of causing the cutters to register accurately in making a cut; substantially as and for the purposes described.

6. A cutter stock for a machine for cutting nails having a channel or channels for receiving and holding the knives, with enlarged recesses at the ends of the channels for receiving and holding guides; substantially as and for the purposes described.

7. In a machine for cutting nails, cutter stocks B and C having channels for receiving and holding the knives with pin and socket guides contained in enlarged recesses at the ends of the channels; substantially as and for the purposes described.

8. In a machine for cutting nails, the cutter stocks B and C, having the channels 41 and 42 with enlarged ends to receive the position guides 34, the pin guides 39 and the socket guides 40 and retain the same rigidly in position; substantially as and for the purposes set forth.

9. In a machine for cutting nails, the cutter stocks B and C constructed with channels 41 and 42, for receiving and retaining the knives E and E', position guides 34 and pin and socket guides 39 and 40, and provided with double lines of set screws 49; substantially as and for the purposes described.

10. In a machine for cutting nails, the oscillating bed stock B, constructed with strengthening flanges 53, cutter channels 41, 42, the enlarged chambers for receiving and retaining the guides 34, and the channels 41 and 42 for receiving and retaining the knives E and E', in combination with the oscillating and reciprocating cutting stock C, constructed with strengthening flanges 53, the enlarged chambers, the cutter channels 41 and 42, and the concentric shoulders 61; substantially as and for the purpose set forth.

11. In a machine for cutting nails, having an oscillating and reciprocating cutter stock operating in conjunction with an oscillating bed stock, the combination of the reciprocating stock having position guides mounted thereon, with bridges on the sides of the frame or housing having guide ways or recesses therein to guide the cutting stock as it descends to make a cut; substantially as and for the purpose set forth.

12. In a machine for cutting nails, the bridge 36 constructed with the jaws 38, and adjustable guiding gibs 37 and attached to the uprights 1 and 2 of the frame; substantially as and for the purposes set forth.

13. In a machine for cutting nails, the bridge 36 constructed with the jaws 38, and provided with the adjustable gibs 37, in combination with the position guide 34 located in the oscillating and reciprocating cutter stock C; substantially as and for the purposes set forth.

14. In a machine for cutting nails, the bridge 36 provided with the jaws 38, the adjustable guiding gibs 37, and the circular bearing surfaces resting on the cutter stocks B, in combination with the position guides 34, the pin guides 39, the socket guides 40, the oscillating cutter stock B, and the oscillating and reciprocating cutter stock C; substantially as and for the purposes set forth.

15. In a machine for cutting nails, the pin guides 39, constructed with cutaways 45 and 47, inclined surface 48 and pin 43 in combination with the cutter stock B; substantially as described.

16. In a machine for cutting nails, the bed stock B, the pin guides 39, constructed with the cutaways 47, in combination with the cutting stock C and the socket guide 40 constructed with the cutaways 47; substantially as and for the purposes set forth.

17. In a machine for cutting nails, a gang of cutting knives placed edge to edge, having cutaways 57 on their contiguous edges and secured in place longitudinally in a channel in the cutting stock by holding devices bearing upon the outer edges of the end knives; substantially as and for the purposes described.

18. In a machine for cutting nails, the combination of the reciprocating cutter stock C with the toggle lever and adjustable suspension and depressing devices; substantially as and for the purposes described.

19. In a machine for cutting nails, the toggle levers 20, 21, provided with the arm 58, the adjustable shoe 59, and the adjusting plates 67; substantially as and for the purposes set forth.

20. In a machine for cutting nails, the toggle levers 20 and 21 constructed with the arms 58 and 62, and provided with the adjustable shoes 59, having concentric surfaces; in combination with the stirrup 63, the oscillating and reciprocating cutter stock C, the adjustable nuts 66 and the plates 67; substantially as and for the purposes set forth.

21. In a machine for cutting nails, the combination of the crank 22, the connecting rod 23, the toggle levers 20 and 21, the stirrups 63, and the oscillating and reciprocating cutter stock C provided with the position guides 34 and socket guides 40, the guide ways 35 and the oscillating cutter stock B provided with the pin guides 39; substantially as and for the purposes set forth.

22. In a machine for cutting nails, the sheet rack 46, provided with the sheet guides 78, the eccentric surfaces 80 and 81, the concentric surfaces 82, and the adjustable guides 89; substantially as and for the purposes set forth.

23. In a machine for cutting nails, the sheet rack 46 provided with the sheet guides, the eccentric surfaces 80 and 81, and the adjustable guides 89, in combination with the oscillating bed cutter stock B, and bridges; substantially as and for the purposes set forth.

24. In a machine for cutting nails, the sheet rack provided with the adjustable nut guides 89 in combination with the bridges 36; substantially as and for the purposes set forth.

25. In a machine for cutting nails, the combination of the sheet rack 46, the trunnion rod 79, the projection 88, the return spring 110, the stop bolt 132, the eccentric surfaces 80, 81, and concentric surfaces 82; substantially as and for the purposes set forth.

26. In a machine for cutting nails, the sheet rack 46 constructed with the eccentric surfaces 80 and 81, the concentric surfaces 82, the slotted projections 88 and the adjustable nut guides 89; in combination with the bridge 36, the supporting rod 86, the return spring 110, the stop bolt 132 and the oscillating bed cutter stock B; substantially as and for the purposes set forth.

27. In a machine for cutting nails, the sheet rack 46 constructed with the eccentric surfaces 80 and 81, and the concentric surfaces 82 and the adjustable nut guides 89; in combination with the bridges 36 and the bed cutter stock B; substantially as and for the purposes set forth.

28. In a machine for cutting nails, the sheet clamps 111 and 112 in combination with a sheet rack provided with the rods 85 and the eccentric surfaces 80 and 81, whereby the sheet of nail plate is lifted and replaced flat upon the cutters of the oscillating bed stock B; substantially as set forth.

29. In a machine for cutting nails, the cam yoke or shift head 30, consisting of the concentrics 91 and 92 and the shoulders 93 and 94; in combination with the cam 31, shift bar 18 and cutter stocks B, C; whereby a comparatively slow motion in starting and stopping the oscillation of the cutter stocks and their connections is secured; substantially as and for the purposes set forth.

30. In a machine for cutting nails the combination of the shaft 11, flanged and cushioned box 96, stirrup 99, shift bar 18 and cutter stocks B, C; substantially as and for the purpose set forth.

31. In a machine for cutting nails, the shift bar, guiding and buffer box 96 constructed with the half flanges 97 provided with the elastic buffers 98, in combination with the stirrup 99 and cam yoke or shift head 30; substantially as and for the purposes set forth.

32. In a machine for cutting nails, the cam or shifting arm 31 and the shaft 11; in combination with the cam yoke 30, the shift bar 18, the stirrup 99, the buffer box 96, and the elastic buffers 98; substantially as and for the purposes set forth.

33. In a machine for cutting nails, the shift bar 18 provided with the cam yoke 30, the stirrup 99, the shift bar, guiding and buffer box 96, the buffers 98, and the slots 103 and 102; in combination with the cranks 19 and 14 and the cutter stocks B and C constructed and operating together; substantially as and for the purposes set forth.

34. In a machine for cutting nails, the feed lever 60 and pawls 161 and 167, in combination with the sliding box 17, the ratchet wheel 166 and the feed rolls 68 and 69; substantially as and for the purposes set forth.

35. In a machine for cutting nails, the combination of the elastic feed lever 60, the feed stop 164 having an adjusting bolt 165, and the sliding box 17; substantially as and for the purposes described.

36. In a machine for cutting nails, the studs 100 in combination with the frame 2 and the shift bars 18; substantially as and for the purposes set forth.

37. In a machine for cutting nails, the automatic oiling devices consisting of the supports 115 and the oiled substance 114, in combination with the position guides 34 and the pin and socket guides 39, 40; substantially as and for the purposes set forth.

38. In a machine for cutting nails in which a gang of reciprocating knives operate in conjunction with a bed knife or knives to cut a series of nails transversely from a sheet; the arrangement of the reciprocating cutting knives herein-described whereby the end knives have the greatest projection and the central knives the least, the intermediate ones receding gradually from the ends to the middle, so that the edges of the sheet shall be first engaged by the end knives and the cut proceed from the edges to the middle of the sheet; substantially as and for the purposes described.

39. In a machine for cutting nails, having an oscillating bed stock carrying cutting knives and an oscillating and reciprocating cutter stock carrying companion knives; the combination of the cutter stock with the bed stock located slightly inside of the vertical line of the cutter stock; substantially as and for the purposes described.

40. In a machine for cutting nails, the combination of a reciprocating cutter stock having cutting knives and centering guides, with a bed stock located slightly inside of the vertical line of the cutter stock and having cutting knives and companion centering guides secured to the bed stock at an inclination equivalent to the want of alignment of the two stocks; substantially as and for the purposes described.

41. The cutting knives E and oscillating bed stock, in combination with the receiving apron 108 elastically secured in front of the knives, substantially as and for the purposes described.

In witness whereof I affix my signature, in the presence of two witnesses, this 7th day of October, 1890.

WILLIAM N. SEVERANCE.

Witnesses:
THOMAS B. KERR,
RAPHAËL NETTER.